United States Patent
Jang et al.

(10) Patent No.: US 11,800,089 B2
(45) Date of Patent: Oct. 24, 2023

(54) SBTMVP-BASED INTER PREDICTION METHOD AND APPARATUS

(71) Applicant: LG ELECTRONICS INC., Seoul (KR)

(72) Inventors: Hyeongmoon Jang, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 17/414,893

(22) PCT Filed: Jan. 2, 2020

(86) PCT No.: PCT/KR2020/000027
§ 371 (c)(1),
(2) Date: Jun. 16, 2021

(87) PCT Pub. No.: WO2020/141886
PCT Pub. Date: Jul. 9, 2020

(65) Prior Publication Data
US 2022/0060689 A1  Feb. 24, 2022

Related U.S. Application Data

(60) Provisional application No. 62/787,754, filed on Jan. 2, 2019.

(51) Int. Cl.
*H04N 19/132* (2014.01)
*H04N 19/159* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/513* (2014.11)

(58) Field of Classification Search
CPC .................................................. H04N 19/105
See application file for complete search history.

(56) References Cited

U.S. PATENT DOCUMENTS 11,012,715 B2 * 5/2021 Zhang .................. H04N 19/176
11,140,412 B2 * 10/2021 Liu ....................... H04N 19/593
(Continued)

FOREIGN PATENT DOCUMENTS

| KR | 10-2017-0021819 A | 2/2017 |
| KR | 10-2017-0066457 A | 6/2017 |
| KR | 10-1747058 B1 | 6/2017 |

OTHER PUBLICATIONS

Jianle Chen et al., "Algorithm description for Versatile Video Coding and Test Model 3 (VTM 3)", JVET-L1002-v1, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-48, See pp. 27-28; and figure 26.

*Primary Examiner* — Irfan Habib
(74) *Attorney, Agent, or Firm* — Bryan Cave Leighton Paisner LLP

(57) ABSTRACT

A method by which a decoding device performs image decoding, according to the present document, comprises the steps of: deriving a reference block on the basis of a motion shift; determining whether a subblock temporal motion vector predictor (sbTMVP) candidate is available, on the basis of whether the reference block is a current picture referencing (CPR) block; deriving motion information about a current block on the basis of the sbTMVP candidate when the sbTMVP candidate is available; generating prediction samples on the basis of the motion information; and generating a restored picture on the basis of the prediction samples, wherein the sbTMVP candidate is determined to be unavailable with respect to the reference block which is the CPR block.

12 Claims, 15 Drawing Sheets

(51) Int. Cl.
*H04N 19/176* (2014.01)
*H04N 19/105* (2014.01)
*H04N 19/513* (2014.01)

(56) References Cited

U.S. PATENT DOCUMENTS

| | | | |
|---|---|---|---|
| 11,368,713 B2* | 6/2022 | Chen | H04N 19/70 |
| 11,470,346 B2* | 10/2022 | Choi | H04N 19/176 |
| 2013/0336407 A1* | 12/2013 | Chen | H04N 19/513 |
| | | | 375/240.16 |
| 2015/0085929 A1* | 3/2015 | Chen | H04N 19/52 |
| | | | 375/240.16 |
| 2016/0219278 A1* | 7/2016 | Chen | H04N 19/503 |
| 2016/0330467 A1* | 11/2016 | Park | H04N 19/597 |
| 2016/0366435 A1* | 12/2016 | Chien | H04N 19/51 |
| 2017/0289566 A1* | 10/2017 | He | H04N 19/147 |
| 2017/0302951 A1* | 10/2017 | Joshi | H04N 19/513 |
| 2018/0176596 A1 | 6/2018 | Jeong et al. | |
| 2018/0255316 A1* | 9/2018 | Zhang | H04N 19/503 |
| 2018/0288430 A1* | 10/2018 | Chen | H04N 19/176 |

\* cited by examiner

SBTMVP-BASED INTER PREDICTION METHOD AND APPARATUS

This application is a National Stage Application of International Application No. PCT/KR2020/000027, filed on Jan. 2, 2020, which claims the benefit of U.S. Provisional Application No. 62/787,754, filed on Jan. 2, 2019, which are hereby incorporated by reference in their entirety for all purposes as if fully set forth herein.

BACKGROUND OF THE DISCLOSURE

Field of the Disclosure

The present document relates to an image coding technology, and more specifically, to a method and an apparatus for performing inter prediction based on a subblock temporal motion vector predictor (sbTMVP).

Related Art

The demands for high-resolution and high-quality images and video, such as an ultra high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

SUMMARY

An object of the present document is to provide a method and an apparatus for enhancing image coding efficiency.

Another object of the present document is to provide an efficient inter prediction method and apparatus.

Still another object of the present document is to provide a method and an apparatus for performing inter prediction by deriving subblock-based motion information.

Yet another object of the present document is to provide a method and an apparatus for deriving subblock motion information in consideration of whether a block becomes a current picture referencing (CPR) in a process of constructing a subblock-based temporal motion vector prediction (sbTMVP) candidate in order to improve imaging coding efficiency.

An exemplary embodiment of the present document provides an image decoding method performed by a decoding apparatus. The method includes deriving a reference block based on a motion shift, determining availability of a subblock temporal motion vector predictor (sbTMVP) candidate based on whether the reference block is a current picture referencing (CPR) block, deriving motion information for a current block based on the sbTMVP candidate if the sbTMVP candidate is available, generating predicted samples based on the motion information, and generating a reconstructed picture based on the predicted samples, in which for the reference block that is the CPR block, it is determined that the sbTMVP candidate is not available.

Another exemplary embodiment of the present document provides an image encoding method performed by an encoding apparatus. The method includes deriving a reference block based on a motion shift, determining availability of a subblock temporal motion vector predictor (sbTMVP) candidate based on whether the reference block is a current picture referencing (CPR) block, deriving motion information for a current block based on the sbTMVP candidate if the sbTMVP candidate is available, generating predicted samples based on the motion information, generating residual samples based on the predicted samples, and encoding image information including information on the residual samples, in which for the reference block that is the CPR block, it is determined that the sbTMVP candidate is not available.

Still another exemplary embodiment of the present document provides non-transitory computer-readable storage medium storing encoded image information causing the image decoding method to be performed.

The present document may enhance the overall image/video compression efficiency.

The present document may reduce calculation complexity through the efficient inter prediction, and improve the overall coding efficiency.

The present document may reduce average complexity of the process of deriving the subblock motion information in consideration of whether the block becomes the current picture referencing block in the process of constructing the subblock-based temporal motion vector prediction (sbTMVP) candidate.

DESCRIPTION OF EXEMPLARY EMBODIMENTS

Figure 1:
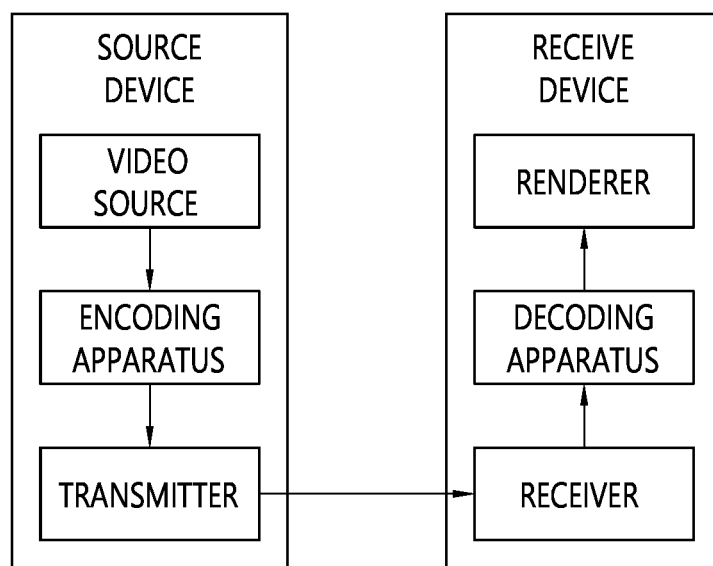
FIG. 1 schematically illustrates an example of a video/image coding system applicable to exemplary embodiments of the present document.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

This document relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in this document. For example, in this document, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

FIG. 1 schematically illustrates an example of a video/image coding system to which embodiments of this document may be applied.

Referring to FIG. 1, a video/image coding system may include a first device (a source device) and a second device (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
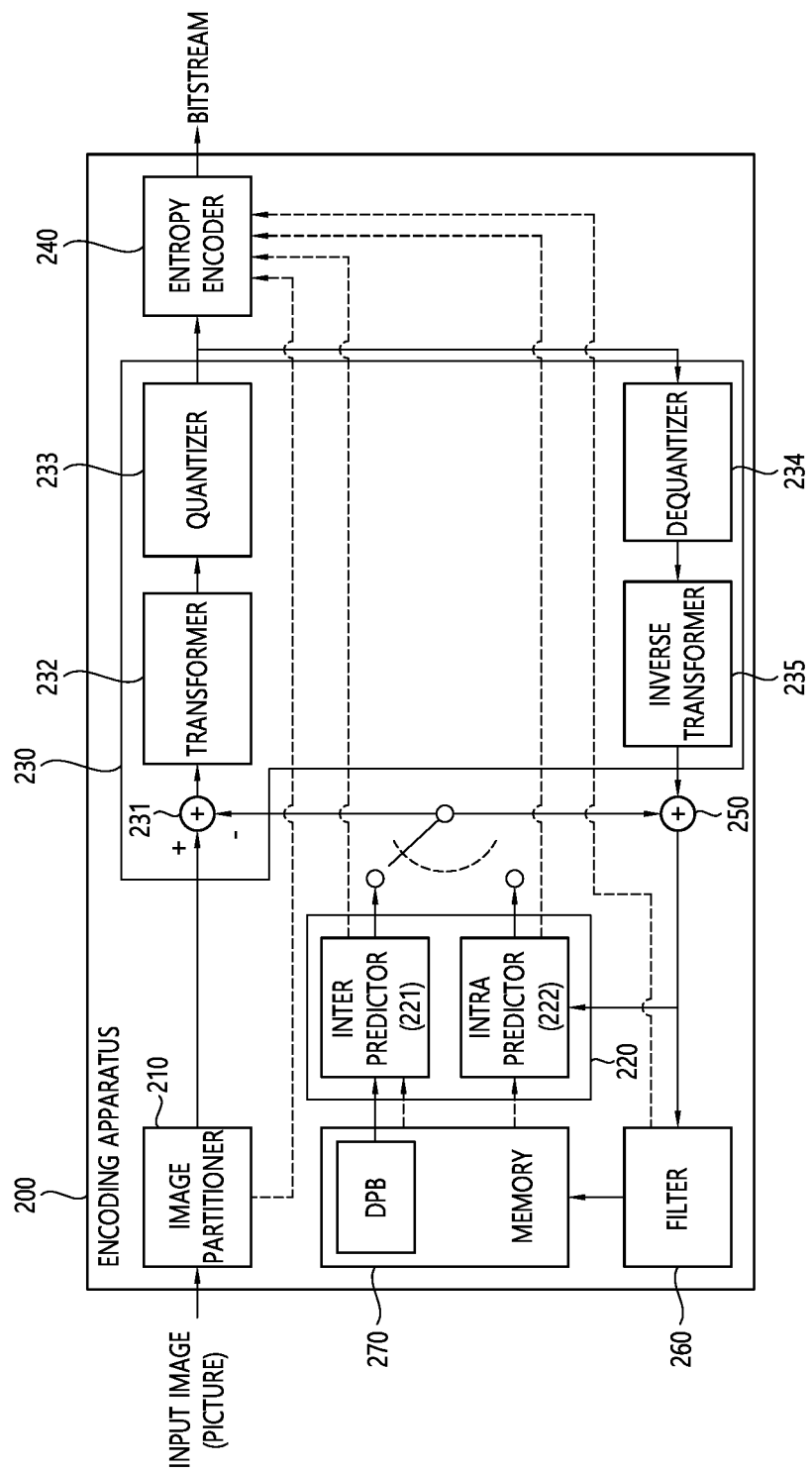
FIG. 2 is a diagram for schematically explaining a configuration of a video/image encoding apparatus applicable to the exemplary embodiments of the present document.

FIG. 2 is a schematic diagram illustrating a configuration of a video/image encoding apparatus to which the embodiment(s) of the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like.

The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
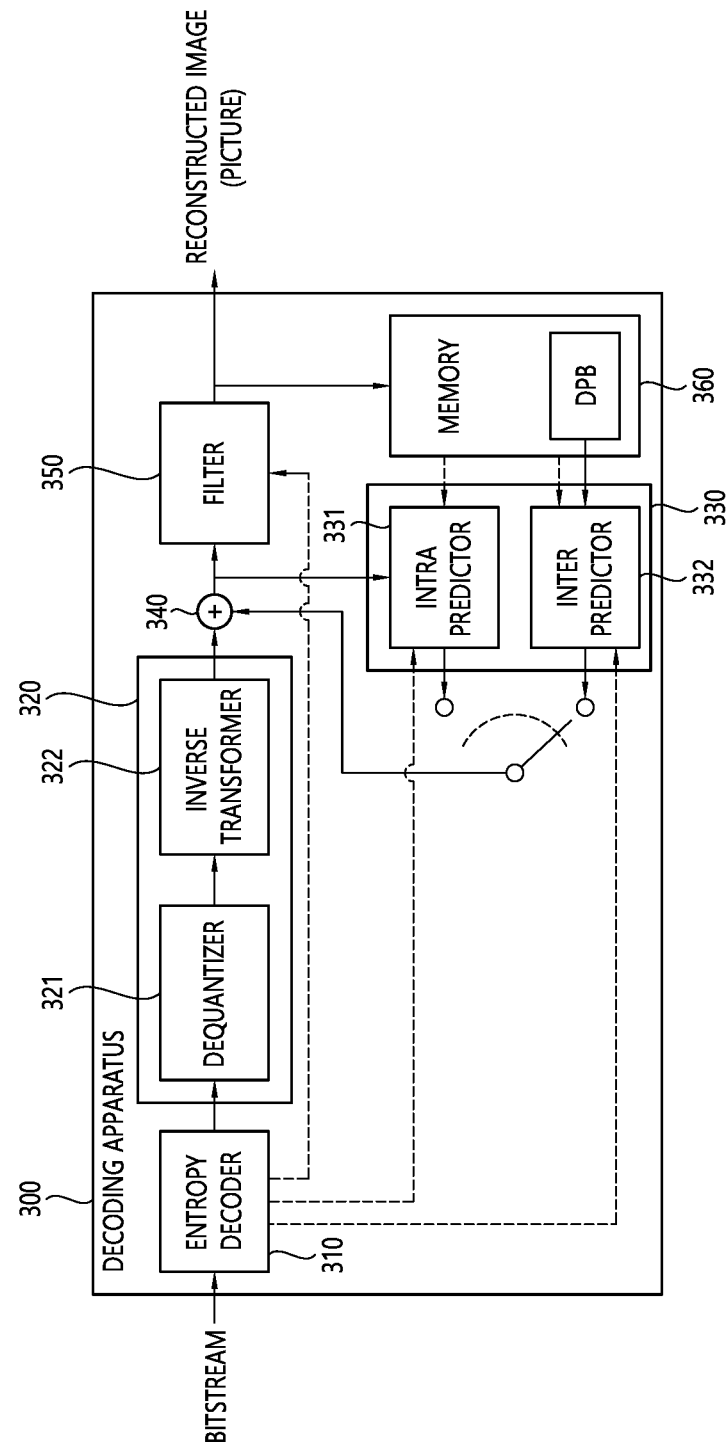
FIG. 3 is a diagram for schematically explaining a configuration of a video/image decoding apparatus applicable to the exemplary embodiments of the present document.

FIG. 3 is a schematic diagram illustrating a configuration of a video/image decoding apparatus to which the embodiment(s) of the present document may be applied.

Referring to FIG. 3, the decoding apparatus 300 may include an entropy decoder 310, a residual processor 320, a predictor 330, an adder 340, a filter 350, a memory 360.

The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Meanwhile, as described above, the inter prediction may be applied when performing the prediction on the current block. That is, the predictor (more specifically, inter predictor) of the encoding/decoding apparatus may derive prediction samples by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Further, various inter prediction modes may be used for the prediction of the current block in the picture. For example, various modes, such as a merge mode, a skip mode, a motion vector prediction (MVP) mode, an affine mode, a subblock merge mode, a merge with MVD (MMVD) mode, and a historical motion vector prediction (HMVP) mode may be used. A decoder side motion vector refinement (DMVR) mode, an adaptive motion vector resolution (AMVR) mode, a bi-prediction with CU-level weight (BCW), a bi-directional optical flow (BDOF), and the like may be further used as additional modes. The affine mode may also be referred to as an affine motion prediction mode. The MVP mode may also be referred to as an advanced motion vector prediction (AMVP) mode. In the present document, some modes and/or motion information candidates derived by some modes may also be included in one of motion information-related candidates in other modes. For example, the HMVP candidate may be added to the merge candidate of the merge/skip modes, or also be added to an mvp candidate of the MVP mode. If the HMVP candidate is used as the motion information candidate of the merge mode or the skip mode, the HMVP candidate may be referred to as the HMVP merge candidate.

The prediction mode information indicating the inter prediction mode of the current block may be signaled from the encoding apparatus to the decoding apparatus. In this case, the prediction mode information may be included in the bitstream and received by the decoding apparatus. The prediction mode information may include index information indicating one of multiple candidate modes. Alternatively, the inter prediction mode may be indicated through a hierarchical signaling of flag information. In this case, the prediction mode information may include one or more flags. For example, whether to apply the skip mode may be indicated by signaling a skip flag, whether to apply the merge mode may be indicated by signaling a merge flag when the skip mode is not applied, and it is indicated that the MVP mode is applied or a flag for additional distinguishing may be further signaled when the merge mode is not applied. The affine mode may be signaled as an independent mode or signaled as a dependent mode on the merge mode or the MVP mode. For example, the affine mode may include an affine merge mode and an affine MVP mode.

Further, as described above, inter prediction may be performed using motion information of the current block. The encoding device may derive optimal motion information for the current block through a motion estimation procedure. For example, the encoding device may search a similar reference block having a high correlation in units of a fractional pixel within a predetermined search range in the reference picture by using an original block in an original picture for the current block and derive the motion information through the searched reference block. The similarity of the block may be derived based on a difference of phase based sample values. For example, the similarity of the block may be calculated based on a sum of absolute differences (SAD) between the current block (or a template of the current block) and the reference block (or the template of the reference block). In this case, the motion information may be derived based on a reference block having a smallest SAD in a search area. The derived motion information may be signaled to the decoding device according to various methods based on the inter prediction mode.

A predicted block for the current block may be derived based on the motion information derived according to the inter prediction mode. The predicted block may include prediction samples (prediction sample array) of the current block. When the motion vector (MV) of the current block indicates a fractional sample unit, an interpolation procedure may be performed and the prediction samples of the current block may be derived based on reference samples of the fractional sample unit in the reference picture through the interpolation procedure. When the affine inter prediction is applied to the current block, the prediction samples may be generated based on a sample/subblock-unit MV. When the bi-prediction is applied, prediction samples derived through a weighted sum or a weighted average of prediction samples derived based on the L0 prediction (i.e., a prediction using a reference picture in the reference picture list L0 and MVL0) and prediction samples (according to a phase) derived based on the L1 prediction (i.e., a prediction using a reference picture in the reference picture list L1 and MVL1) may be used as the prediction samples of the current block. When the bi-prediction is applied, if the reference picture used for the L0 prediction and the reference picture used for the L1 prediction are located in different temporal directions based on the current picture (i.e., if the prediction corresponds to the bi-prediction and the bi-directional prediction), this may be referred to as a true bi-prediction.

Reconstruction samples and reconstruction pictures may be generated based on the derived prediction samples and thereafter, the procedure such as in-loop filtering, etc., may be performed as described above.

Figure 4:
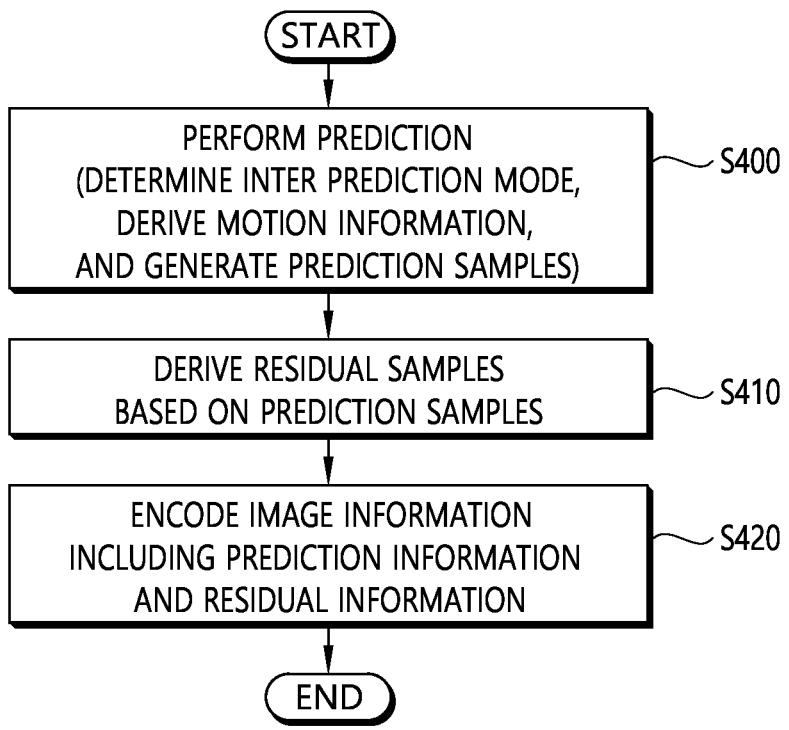
FIG. 4 illustrates an example of a video/image encoding method based on inter prediction.
Figure 5:
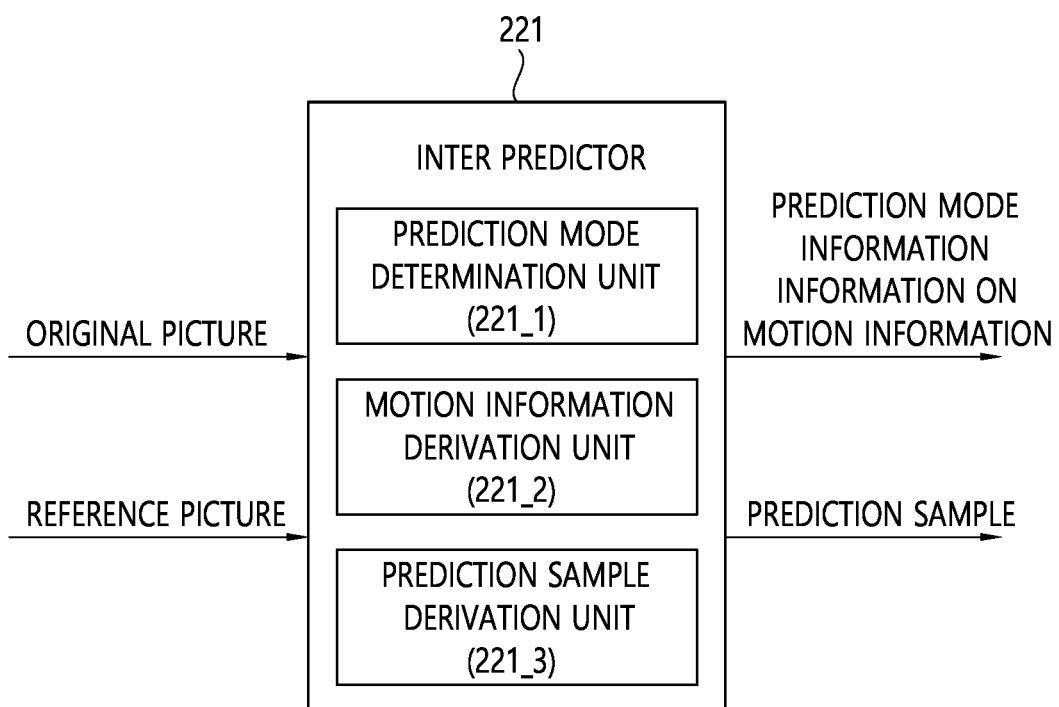
FIG. 5 is an example schematically illustrating an inter predictor in the encoding apparatus.

FIG. 4 illustrates one example of a video/image encoding method based on an inter prediction and FIG. 5 illustrates one example schematically illustrating an inter-prediction unit in an encoding apparatus. The inter-prediction unit in the encoding apparatus of FIG. 5 may also be applied to be the same as or correspond to the inter-prediction unit 221 of the encoding apparatus 200 of FIG. 2.

Referring to the FIGS. 4 and 5, the encoding apparatus performs the inter prediction for the current block (S400). The encoding apparatus may derive the inter prediction mode and the motion information of the current block and generate the prediction samples of the current block. Here, an inter prediction mode determining procedure, a motion information deriving procedure, and a generation procedure of the prediction samples may be simultaneously performed and any one procedure may be performed earlier than other procedures.

For example, the inter-prediction unit 221 of the encoding apparatus may include a prediction mode determination unit 221_1, a motion information derivation unit 221_2, and a prediction sample derivation unit 221_3, and the prediction mode determination unit 221_1 may determine the prediction mode for the current block, the motion information derivation unit 221_2 may derive the motion information of the current block, and the prediction sample derivation unit 221_3 may derive the prediction samples of the current block. For example, the inter-prediction unit 221 of the encoding apparatus may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoding apparatus may determine a mode applied to the current block among various prediction modes. The encoding apparatus may compare RD cost for the various prediction modes and determine an optimal prediction mode for the current block.

For example, when the skip mode or the merge mode is applied to the current block, the encoding device may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoding device. The motion information of the current block may be derived by using the motion information of the selected merge candidate.

As another example, when an (A)MVP mode is applied to the current block, the encoding device may configure an (A)MVP candidate list and use a motion vector of a selected mvp candidate among motion vector predictor (mvp) candidates included in the (A)MVP candidate list as the mvp of the current block. In this case, for example, the motion vector indicating the reference block derived by the motion estimation may be used as the motion vector of the current block and an mvp candidate having a motion vector with a smallest difference from the motion vector of the current block among the mvp candidates may become the selected mvp candidate. A motion vector difference (MVD) which is a difference obtained by subtracting the mvp from the motion vector of the current block may be derived. In this case, the information on the MVD may be signaled to the decoding apparatus. Further, when the (A)MVP mode is applied, the value of the reference picture index may be configured as reference picture index information and separately signaled to the decoding apparatus.

The encoding apparatus may derive the residual samples based on the predicted samples (S410). The encoding apparatus may derive the residual samples by comparing original samples and the prediction samples of the current block.

The encoding apparatus encodes image information including prediction information and residual information (S420). The encoding apparatus may output the encoded image information in the form of a bitstream. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Further, the information on the motion information may include the information on the MVD and/or the reference picture index information. Further, the information on the motion information may include information indicating whether to apply the L0 prediction, the L1 prediction, or the bi-prediction. The residual information is information on the residual samples. The residual information may include information on quantized transform coefficients for the residual samples.

An output bitstream may be stored in a (digital) storage medium and transferred to the decoding device or transferred to the decoding device via the network.

Meanwhile, as described above, the encoding device may generate a reconstructed picture (including reconstructed samples and reconstructed blocks) based on the reference samples and the residual samples. This is to derive the same prediction result as that performed by the decoding device, and as a result, coding efficiency may be increased. Accordingly, the encoding apparatus may store the reconstruction picture (or reconstruction samples or reconstruction blocks) in the memory and utilize the reconstruction picture as the reference picture. The in-loop filtering procedure may be further applied to the reconstruction picture as described above.

Figure 6:
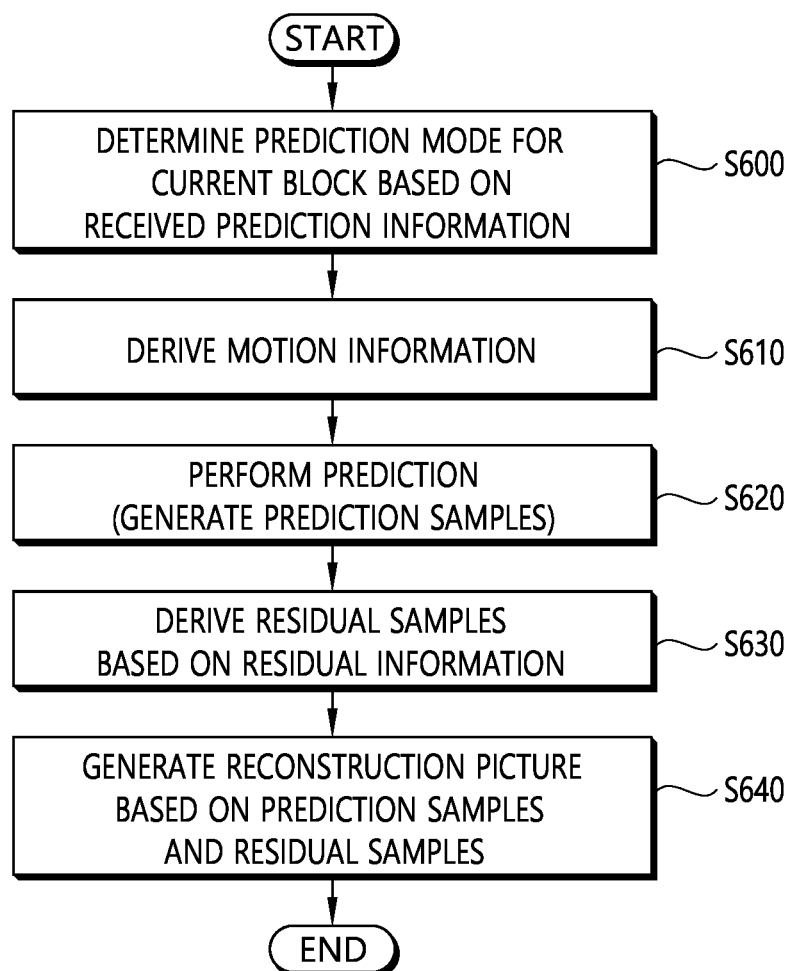
FIG. 6 illustrates an example of a video/image decoding method based on the inter prediction.
Figure 7:
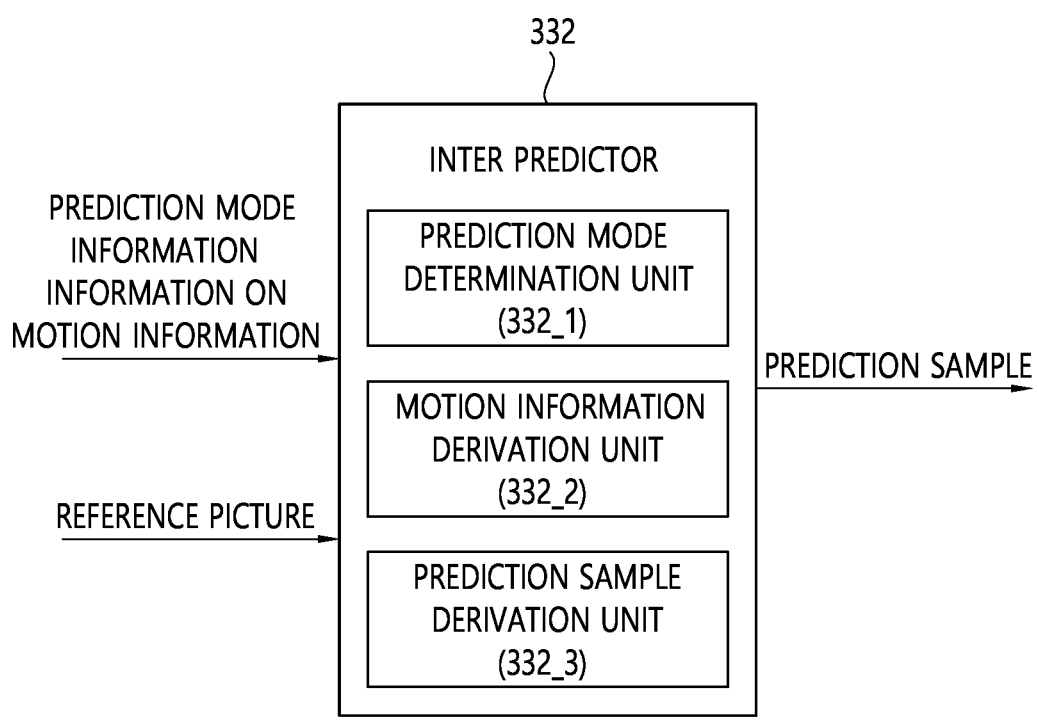
FIG. 7 is an example schematically illustrating an inter predictor in the decoding apparatus.

FIG. 6 illustrates one example of a video/image decoding method based on an inter prediction and FIG. 7 illustrates one example schematically illustrating an inter-prediction unit in a decoding apparatus. The inter-prediction unit in the decoding apparatus of FIG. 7 may also be applied to be the same as or correspond to the inter-prediction unit 332 of the decoding apparatus 300 of FIG. 3.

Referring to FIGS. 6 and 7, the decoding apparatus may perform an operation corresponding to the operation performed by the encoding apparatus. The decoding apparatus may perform the prediction for the current block based on received prediction information and derive the prediction samples.

Specifically, the decoding apparatus may determine the prediction mode for the current block based on the received prediction information (S600). The decoding apparatus may determine which inter prediction mode is applied to the current block based on the prediction mode information in the prediction information.

For example, it may be determined whether the merge mode or the (A)MVP mode is applied to the current block based on the merge flag. Alternatively, one of various inter prediction mode candidates may be selected based on the mode index. The inter prediction mode candidates may include a skip mode, a merge mode, and/or an (A)MVP mode or may include various inter prediction modes described above.

The decoding apparatus derives the motion information of the current block based on the determined inter prediction mode (S610). For example, when the skip mode or the merge mode is applied to the current block, the decoding device may configure the merge candidate list and select one merge candidate among the merge candidates included in the merge candidate list. Here, the selection may be performed based on the selection information (merge index). The motion information of the current block may be derived by using the motion information of the selected merge candidate. The motion information of the selected merge candidate may be used as the motion information of the current block.

As another example, when an (A)MVP mode is applied to the current block, the decoding apparatus may configure an (A)MVP candidate list and use a motion vector of a selected mvp candidate among motion vector predictor (mvp) candidates included in the (A)MVP candidate list as the mvp of the current block. Here, the selection may be performed based on the selection information (mvp flag or mvp index). In this case, the MVD of the current block may be derived based on the information on the MVD, and the motion vector of the current block may be derived based on the mvp of the current block and the MVD. Further, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without a candidate list configuration and in this case, the motion information of the current block may be derived according to a procedure disclosed in the prediction mode. In this case, the candidate list configuration may be omitted.

The decoding apparatus may generate the prediction samples for the current block based on the motion information of the current block (S620). In this case, the reference picture may be derived based on the reference picture index of the current block and the prediction samples of the current block may be derived by using the samples of the reference block indicated by the motion vector of the current block on the reference picture.

In this case, in some cases, a predicted sample filtering procedure for all or some of the prediction samples of the current block may be further performed.

For example, the inter-prediction unit 332 of the decoding apparatus may include a prediction mode determination unit 332_1, a motion information derivation unit 332_2, and a prediction sample derivation unit 332_3, and the prediction mode determination unit 332_1 may determine the prediction mode for the current block based on the received prediction mode information, the motion information derivation unit 332_2 may derive the motion information (the motion vector and/or reference picture index) of the current block based on the information on the received motion information, and the prediction sample derivation unit 332_3 may derive the predicted samples of the current block.

The decoding apparatus generates the residual samples for the current block based on the received residual information (S630). The decoding apparatus may generate the reconstruction samples for the current block based on the prediction samples and the residual samples and generate the reconstruction picture based on the generated reconstruction samples (S640). Thereafter, the in-loop filtering procedure may be further applied to the reconstruction picture as described above.

As described above, the inter prediction procedure may include an inter prediction mode determining step, a motion information deriving step depending on the determined prediction mode, and a prediction performing (predicted sample generating) step based on the derived motion information. The inter prediction procedure may be performed by the encoding apparatus and the decoding apparatus as described above.

Meanwhile, in deriving the motion information of the current block, the motion information candidate(s) may be derived based on spatial neighboring block(s) and temporal neighboring blocks(s), and the motion information candidate for the current block may be selected based on the derived motion information candidate(s). At this time, the selected motion information candidate may be used as the motion information of the current block.

Figure 8:
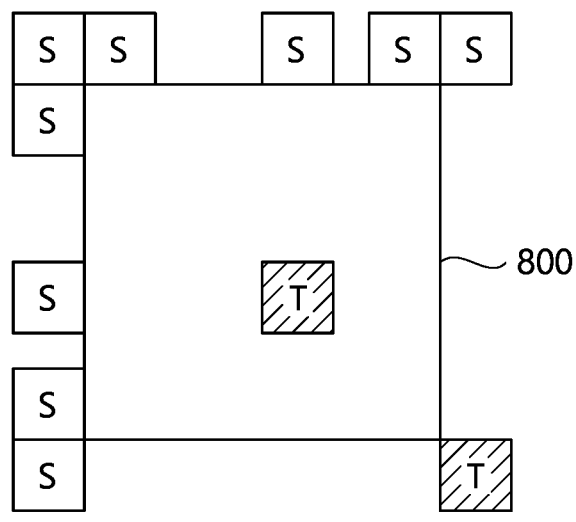
FIG. 8 exemplarily illustrates spatial neighboring blocks and temporal neighboring blocks of a current block.

FIG. 8 exemplarily illustrates the spatial neighboring blocks and the temporal neighboring blocks of the current block.

Referring to FIG. 8, the spatial neighboring block refers to neighboring blocks positioned around a current block 800, which is a target currently performing the inter prediction, and may include neighboring blocks positioned around a left of the current block 800 or neighboring blocks positioned around a top of the current block 800. For example, the spatial neighboring block may include a bottom-left corner neighboring block, a left neighboring block, a top-right corner neighboring block, a top neighboring block, and a top-left corner neighboring block of the current block 800. FIG. 8 illustrates the spatial neighboring blocks as "S".

According to an exemplary embodiment, the encoding apparatus/the decoding apparatus may detect available neighboring blocks by searching for the spatial neighboring blocks (e.g., the bottom-left corner neighboring block, the left neighboring block, the top-right corner neighboring block, the top neighboring block, and the top-left corner neighboring block) of the current block according to a predetermined order, and derive motion information of the detected neighboring blocks as a spatial motion information candidate.

The temporal neighboring block is a block positioned on a picture (i.e., reference picture) different from a current picture including the current block 800, and refers to a collocated block of the current block 800 in the reference picture. Here, the reference picture may be before or after the current picture on a picture order count (POC). Further, the reference picture used for deriving the temporal neighboring block may be referred to as a col picture (collocated picture). Further, the collocated block may refer to a block located at a position in the col picture corresponding to the position of the current block 800, and be referred to as a col block. For example, as illustrated in FIG. 8, the temporal neighboring block may include a col block (i.e., col block including a bottom-right corner sample) positioned corresponding to a position of the bottom-right corner sample of the current block 800 in the reference picture (i.e., col picture) and/or a col block (i.e., col block including a below-right center sample) positioned corresponding to a position of the below-right center sample of the current block 800 in the reference picture (i.e., col picture). FIG. 8 illustrates the temporal neighboring blocks as "T".

According to the exemplary embodiment, the encoding apparatus/the decoding apparatus may detect an available block by searching for the temporal neighboring blocks (e.g., col block including the bottom-right corner sample and the col block including the below-right center sample) of the current block according to a predetermined order, and derive motion information of the detected block as a temporal motion information candidate. As described above, a technique using the temporal neighboring block may be referred to as a temporal motion vector prediction (TMVP).

In other words, the spatial motion information candidate may be derived from the spatial neighboring blocks based on spatial similarity, and the temporal motion information candidate may be derived from the temporal neighboring blocks based on temporal similarity. However, since the TMVP method using the temporal neighboring block uses the motion information of the col block in the reference picture corresponding to the position of the bottom-right corner sample of the current block or the position of the below-right center sample of the current block, there is a limit in that the intra motion is not reflected Therefore, as a method for improving the conventional TMVP method, an adaptive temporal motion vector prediction (ATMVP) may be used. The ATMVP is a method for correcting temporal similarity information considering the spatial similarity, and a method for deriving the col block based on the position indicated by the motion vector of the spatial neighboring block, and using the motion vector of the derived col block as the temporal motion information candidate (i.e., ATMVP candidate). As described above, the ATMVP may derive the col block using the spatial neighboring block, thereby securing a higher accuracy of the col block than that of the conventional TMVP method.

Figure 9:
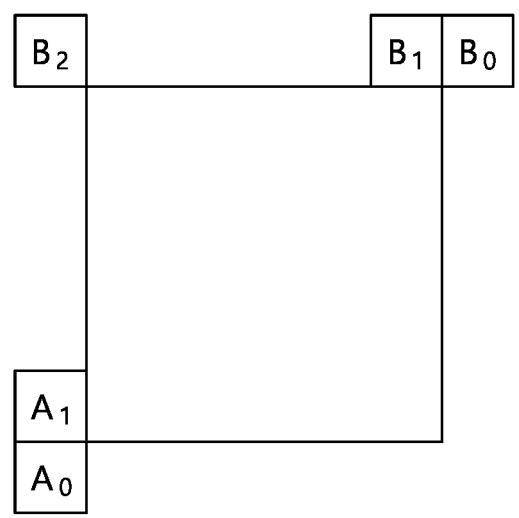
FIG. 9 exemplarily illustrates spatial neighboring blocks which may be used for deriving a temporal motion information candidate (ATMVP candidate).

FIG. 9 exemplarily illustrates the spatial neighboring blocks which may be used for deriving the temporal motion information candidate (ATMVP candidate).

As described above, an ATMVP-based inter prediction method (hereinafter, referred to as an ATMVP mode) may derive the col block (or collocated reference block) using the spatial neighboring block of the current block, and construct the derived col block as the temporal motion information candidate (i.e., ATMVP candidate) based on the motion information of the col block.

Referring to FIG. 9, in the ATMVP mode, the spatial neighboring block may include at least one of a bottom-left corner neighboring block (A0), a left neighboring block (A1), a top-right corner neighboring block (B0), a top neighboring block (B1), and a top-left corner neighboring block (B2) of the current block. In some cases, the spatial neighboring block may further include other neighboring blocks other than the neighboring blocks illustrated in FIG. 9 as well, or may not include a specific neighboring block among the neighboring blocks illustrated in FIG. 9 either. Further, the spatial neighboring block may also include only the specific neighboring block, and for example, include only the left neighboring block (A1) of the current block.

If the ATMVP mode is applied, the encoding apparatus/the decoding apparatus may detect a motion vector (temporal vector) of a first available spatial neighboring block while searching for the spatial neighboring blocks according to a predetermined searching order in constructing the temporal motion information candidate, and set, as the col block (i.e., collocated reference block), the block at a position indicated by the motion vector (temporal vector) of the spatial neighboring block in the reference picture.

At this time, whether the spatial neighboring block is available may be determined by reference picture information, prediction mode information, position information, and the like of the spatial neighboring block. For example, if the reference picture of the spatial neighboring block and the reference picture of the current block are the same, it may be determined that the corresponding spatial neighboring block is available. Alternatively, if the spatial neighboring block is coded in the intra prediction mode or the spatial neighboring block is positioned outside the current picture/tile, it may be determined that the corresponding spatial neighboring block is not available.

Further, the searching order of the spatial neighboring blocks may be variously defined, and for example, may be the order of A1, B1, B0, A0, and B2. Alternatively, whether the A1 is available may be determined by searching for only the A1.

Meanwhile, the prediction may also be performed by deriving the motion information in units of subblock according to the inter prediction mode. For example, in the affine mode or the ATMVP mode, the motion information may be derived in units of subblock. Particularly, a method for deriving the temporal motion information candidate in units of subblock may be referred to as a subblock-based temporal motion vector prediction (sbTMVP) candidate. Hereinafter, a method for deriving the sbTMVP candidate will be described in detail.

Figure 10:
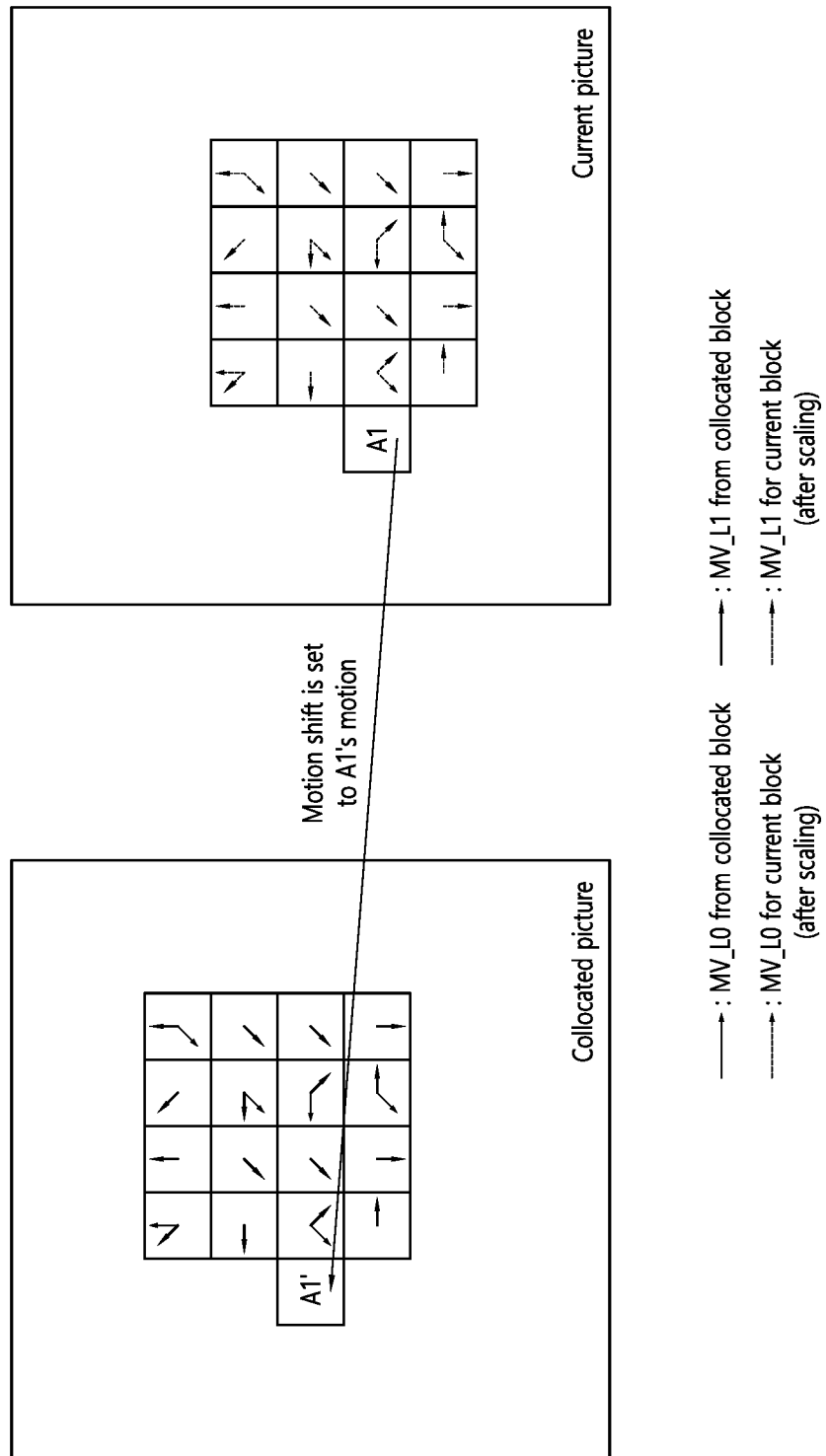
FIG. 10 is a diagram for schematically explaining a process of deriving a subblock-based temporal motion information candidate (sbTMVP candidate).

FIG. 10 is a diagram for schematically explaining a process of deriving the subblock-based temporal motion information candidate (sbTMVP candidate).

The sbTMVP is a method using a motion field in the col picture to improve the motion vector prediction (MVP) and the merge mode of coding units in the current picture, and the col picture of the sbTMVP may be the same as the col picture used by the TMVP. However, the TMVP performs the motion prediction at a coding unit (CU) level, but the sbTMVP may perform the motion prediction at a subblock level or a sub-coding unit (sub-CU) level. Further, the TMVP fetches the temporal motion information from the col block in the col picture (here, the col block is a col block corresponding to the position of the bottom-right corner sample of the current block or the position of the below-right center sample of the current block), and the sbTMVP fetches the temporal motion information after applying a motion shift from the col picture. Here, the motion shift may mean a process of deriving the col block for the current block using the motion vector of one (e.g., A1 neighboring block) of the spatial neighboring blocks of the current block.

Referring to FIG. 10, the encoding apparatus/the decoding apparatus may first determine whether the spatial neighboring block (e.g., A1) of the current block is available. For example, if the reference picture of the spatial neighboring block (e.g., A1) uses the col picture, it may be determined that the spatial neighboring block (e.g., A1) is available, and the motion vector of the spatial neighboring block (e.g., A1) may be derived. At this time, the motion vector of the spatial neighboring block (e.g., A1) may be referred to as a temporal MV (tempMV), and the motion vector may be used for the motion shift. Alternatively, if it is determined that the spatial neighboring block (e.g., A1) is not available, the temporal MV (i.e., motion vector of the spatial neighboring block) may be set as a zero vector. In other words, in this case, the motion shift may be set as (0, 0).

Next, the encoding apparatus/the decoding apparatus may apply the motion shift based on the motion vector of the spatial neighboring block (e.g., A1). For example, the motion shift may be set as the motion vector of the spatial neighboring block (e.g., A1). In other words, the motion vector of the spatial neighboring block (e.g., A1) may be added to the coordinate of the current block by applying the motion shift.

Next, the encoding apparatus/the decoding apparatus may derive a col subblock (collocated subblock) motion-shifted on the col picture and obtain the motion information (motion vector, reference index, and the like) of each col subblock. In other words, the encoding apparatus/the decoding apparatus may derive each of the col subblocks on the col picture corresponding to a position (i.e., position indicated by the motion vector of the spatial neighboring block (e.g., A1)) motion-shifted at the position of the center sample of the respective subblocks for the current block. Further, the motion information of the respective col subblocks may be used as the motion information (i.e., sbTMVP candidate) of the respective subblocks for the current block. Here, the position of the center sample may refer to a sample positioned at the bottom-right end among 4 samples positioned at the center of the subblock.

At this time, a scaling may be applied to the motion vectors of the col subblock. The scaling may be performed based on a temporal distance difference between the reference picture of the col block and the reference picture of the current block. Therefore, the scaling may be referred to as a temporal motion scaling, such that the reference pictures of the current block and the reference pictures of the temporal motion vectors may be aligned. In this case, the encoding apparatus/the decoding apparatus may obtain the scaled motion vectors of the col subblock as the motion information of the respective subblocks for the current block.

Further, in deriving the motion information of the col subblock, motion information of a specific col subblock may not be available either. In this case, for the specific col subblock whose motion information is not available, the motion vector of the block positioned at the center of the col block (i.e., block including the sample positioned at the bottom-right end among 4 samples of the center) may be used, and the motion vector may be stored as a base motion vector (i.e., default motion vector).

As described above, in the case of the affine mode or the sbTMVP mode in which the motion information is derived in units of subblock, the affine merge candidates and the sbTMVP candidate may be derived, and a subblock-based merge candidate list may be constructed based on such candidates. At this time, flag information indicating whether the affine mode or the sbTMVP mode is enabled or disabled may be signaled. If the sbTMVP mode is enabled based on the flag information, the thus derived sbTMVP candidate may be added to a firstly-ordered of the subblock-based merge candidate list. Further, the affine merge candidates may be added to a next ordered of the subblock-based merge candidate list. Here, the maximum number of candidates of the subblock-based merge candidate list may be 5.

Further, in the sbTMVP mode, the size of the subblock may be fixed, and for example, fixed to the size of 8×8.

Further, the sbTMVP mode may be applied to only a block whose width and height are all 8 or more.

Meanwhile, the prediction for the current block may be performed based on an intra block copy (IBC) prediction mode. The IBC prediction mode may be used for a content image/video coding of a game or the like, such as a screen content coding (SCC). The IBC basically performs the prediction in the current picture but may be performed similarly to the inter prediction in that the reference block is derived in the current picture. In other words, the IBC may use at least one of the inter prediction techniques described in the present document.

For example, the IBC may use at least one of the aforementioned methods for deriving the motion information (motion vector). At least one of the inter prediction techniques may be also partially modified and used in consideration of the IBC prediction as described later. The IBC may refer to the current picture, and thus also be referred to as a current picture referencing (CPR). For example, whether the IBC is applied to the current block may be indicated based on an IBC flag (e.g., pred_mode_ibc_flag). The IBC flag (e.g., pred_mode_ibc_flag) may be coded as a syntax element and generated in the form of a bitstream, and signaled from the encoding apparatus to the decoding apparatus through the bitstream.

For the IBC prediction, the encoding apparatus may derive an optimal block vector (or motion vector) for the current block (e.g., CU) by performing a block matching (BM). The derived block vector (or motion vector) may be signaled to the decoding apparatus through the bitstream using a method similar to the aforementioned signaling of the motion information (motion vector) in the inter prediction. The decoding apparatus may derive the reference block for the current block in the current picture through the signaled block vector (motion vector), thereby deriving a prediction signal (predicted block or predicted samples) for the current block. Here, the block vector may correspond to the aforementioned motion vector, and represent displacement from the current block to the reference block positioned in an already reconstructed area in the current picture. Therefore, the block vector (or motion vector) may also be referred to as a displacement vector. The motion vector in the IBC may correspond to the block vector or the displacement vector. Further, the MVD in the IBC may be referred to as a block vector difference (BVD). The motion vector of the current block may include a motion vector for a luma component (luma motion vector) or a motion vector for a chroma component (chroma motion vector). For example, the luma motion vector for the IBC-coded CU may be an integer sample unit (i.e., integer precision). The chroma motion vector may also be clipped in the integer sample unit. As described above, the IBC may use at least one of the inter prediction techniques, and for example, if the IBC is applied like the AMVR, a 1-pel or 4-pel motion vector precision may be switched.

At the CU level, the IBC prediction mode may be signaled through the flag, and signaled to the IBC (A)MVP mode or the IBC skip/merge mode.

For example, in the IBC skip/merge mode, the block vector of the current block may be derived using a merge candidate index. Here, the merge candidate index may indicate which block vector among the block vectors in the list constructed based on the IBC mode-coded neighboring candidate blocks is used to predict the current block. The merge candidate list may be configured to include the spatial candidate, the historical motion vector prediction (HMVP) candidate, and a pairwise candidate.

In the IBC (A)MVP mode, the block vector difference (BVD) may be coded in the same manner as that in the MVD. The block vector prediction method may use two candidates as a predictor, and the two candidates may be derived from a (IBC mode-coded) left neighboring block and a (IBC mode-coded) top neighboring block. At this time, if the left neighboring block or the top neighboring block is not available, the default block vector may be used as the predictor. The flag may be signaled as index information for indicating the block vector predictor.

Hereinafter, the present document proposes a method for effectively performing the prediction in consideration of whether it is a block coded based on the IBC when constructing the sbTMVP candidate in the process of performing the inter prediction. Particularly, if the reference block (i.e., col block) for the current block is a block coded with the current picture referencing (CPR) in the process of constructing the sbTMVP candidate, the reference block may not be used as the effective sbTMVP candidate, such that the present document proposes a method for excluding the sbTMVP candidate in the process of constructing the motion information candidates in units of subblock. It is possible to obtain the effect of reducing average complexity in the process of constructing the motion information candidates in units of subblock using the proposed method.

Figure 11:
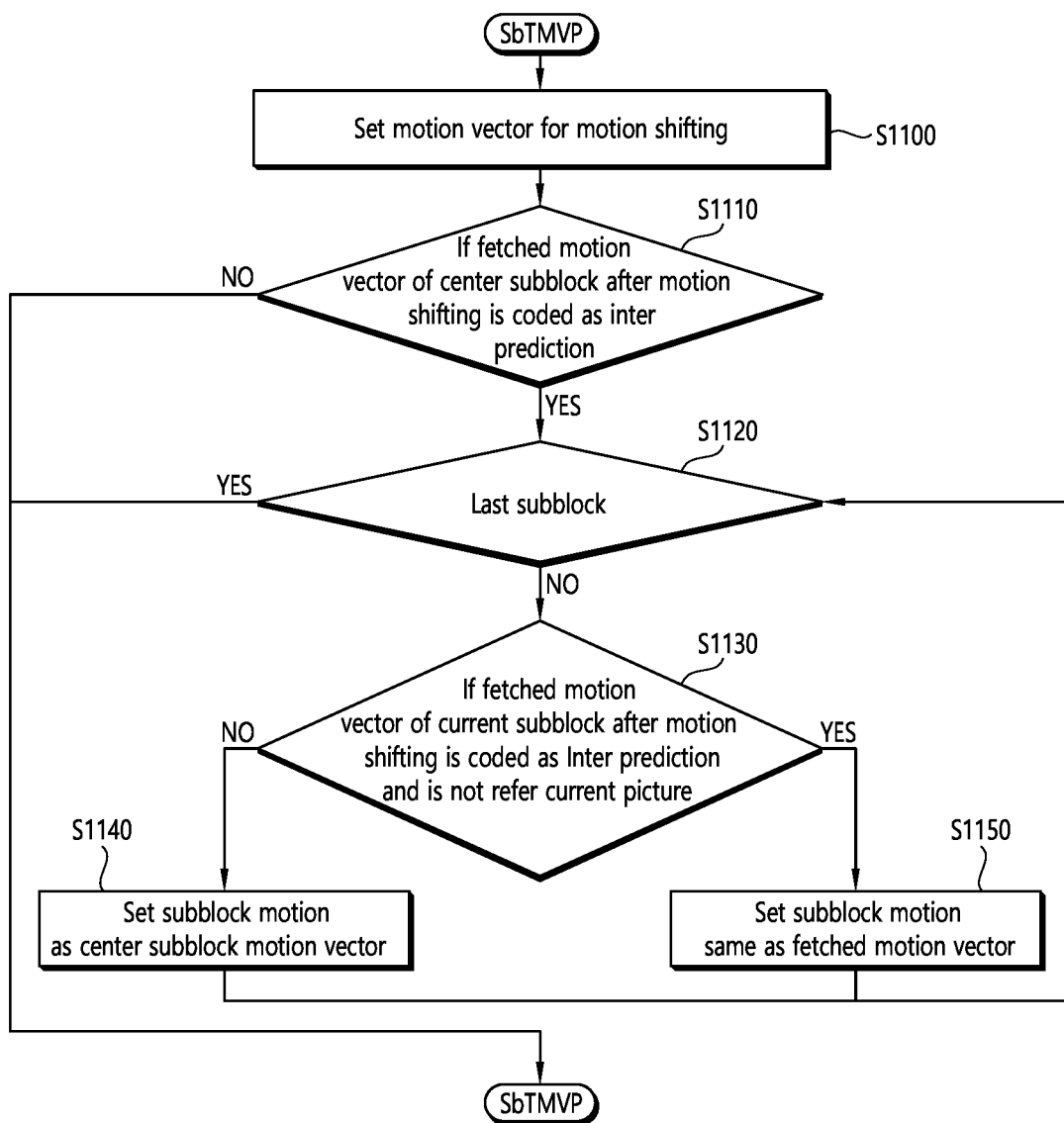
FIG. 11 illustrates an exemplary embodiment of a method for deriving the sbTMVP candidate considering a CPR.

FIG. 11 illustrates an exemplary embodiment of the method for deriving the sbTMVP candidate considering the CPR.

Referring to FIG. 11, the encoding apparatus/the decoding apparatus may set the motion information (i.e., motion vector) for the motion shift (S1100).

Here, the motion information for the motion shift may include the motion vector derived from the spatial neighboring block. The spatial neighboring block may include at least one of the bottom-left corner neighboring block (A0), left neighboring block (A1), top-right corner neighboring block (B0), top neighboring block (B1), and top-left corner neighboring block (B2) of the current block. Alternatively, the spatial neighboring block may include only the left neighboring block (A1) of the current block.

According to the exemplary embodiment, the encoding apparatus/the decoding apparatus may derive the motion vector from one (e.g., left neighboring block (A1)) of the spatial neighboring blocks to derive the reference block for the current block, and derive the reference block for the current block by performing the motion shift based on the motion vector of the spatial neighboring block (e.g., left neighboring block (A1)).

Here, as described above, the reference block may be the col block derived based on the motion shift in the collocated reference picture (i.e., col picture) used to derive the sbTMVP candidate. For example, the reference block may be the col block motion-shifted by the motion vector of the spatial neighboring vector (e.g., left neighboring vector (A1)) based on the position of the center sample of the current block. For convenience of explanation, the motion-shifted reference block may be referred to as a center reference block, a center reference subblock, a center subblock, or the like.

The encoding apparatus/the decoding apparatus may determine whether the motion information of the reference block (i.e., center subblock) derived based on the motion shift is available (S1110). At this time, according to the exemplary embodiment illustrated in FIG. 11, the encoding apparatus/the decoding apparatus may determine whether the reference block (i.e., center subblock) is coded in the inter prediction mode.

If the reference block (i.e., center subblock) is not the block coded in the inter prediction mode, the encoding apparatus/the decoding apparatus may not perform the process of deriving the sbTMVP candidate. In this case, the encoding apparatus/the decoding apparatus may exclude the sbTMVP candidate from the motion information candidate list by determining that the sbTMVP candidate is not available. Here, as described above, the motion information candidate list may be the subblock-based merge candidate list including the affine merge candidates and the sbTMVP candidate derived based on the affine mode or the sbTMVP mode.

If the reference block (i.e., center subblock) is the block coded in the inter prediction mode, the encoding apparatus/the decoding apparatus may perform the process of deriving the subblock based the motion information for the current block (i.e., process of deriving the sbTMVP candidate). In other words, the encoding apparatus/the decoding apparatus may perform a next process for each of the reference subblocks of the current block in units of subblock. Here, the reference subblocks may be subblocks (i.e., col subblocks) on the reference picture (i.e., col picture) corresponding to each of the subblocks in the current block. For example, the current block may include first to $n^{th}$ subblocks, and correspondingly, the reference subblocks may also include the first to $n^{th}$ subblocks. In other words, the encoding apparatus/the decoding apparatus may perform a next process for each of the first to $n^{th}$ reference subblocks.

The encoding apparatus/the decoding apparatus may determine whether the current reference subblock is any one of the first to $n^{th}$ reference subblocks (S1120). In other words, the encoding apparatus/the decoding apparatus may determine whether the current reference subblock is the last subblock, and if it is the last subblock, the encoding apparatus/the decoding apparatus may terminate the process of deriving the sbTMVP candidate, and otherwise, continue to perform the process of deriving the sbTMVP candidate.

If the current reference subblock is any one of the first to $n^{th}$ reference subblocks, the encoding apparatus/the decoding apparatus may determine whether the current reference subblock is the block coded in the inter prediction mode and is not the CPR block referring to the current picture (S1130).

Here, the CPR block refers to a block coded in the mode (CPR mode or IBC mode) in which the prediction is performed with reference to the current picture. For example, the encoding apparatus/the decoding apparatus may determine whether the current reference subblock is the CPR block based on whether a first reference picture to which the reference block refers is the same as a second reference picture in which the reference block is positioned. In other words, if the first reference picture and the second reference picture are the same, the current reference subblock may be the CPR block.

If the current reference subblock is not the block coded in the inter prediction mode or the current reference subblock is the CPR block, the encoding apparatus/the decoding apparatus may set the motion information of the center reference subblock as the subblock based the motion information for the current block (S1140). In other words, the encoding apparatus/the decoding apparatus may set the motion information for the subblock in the current block corresponding to the current reference subblock as the motion information of the center reference subblock.

If the current reference subblock is the block coded in the inter prediction mode and is not the CPR block, the encoding apparatus/the decoding apparatus may set the motion information of the current reference subblock as the subblock based the motion information for the current block by deriving the motion information of the current reference subblock (S1150).

Figure 12:
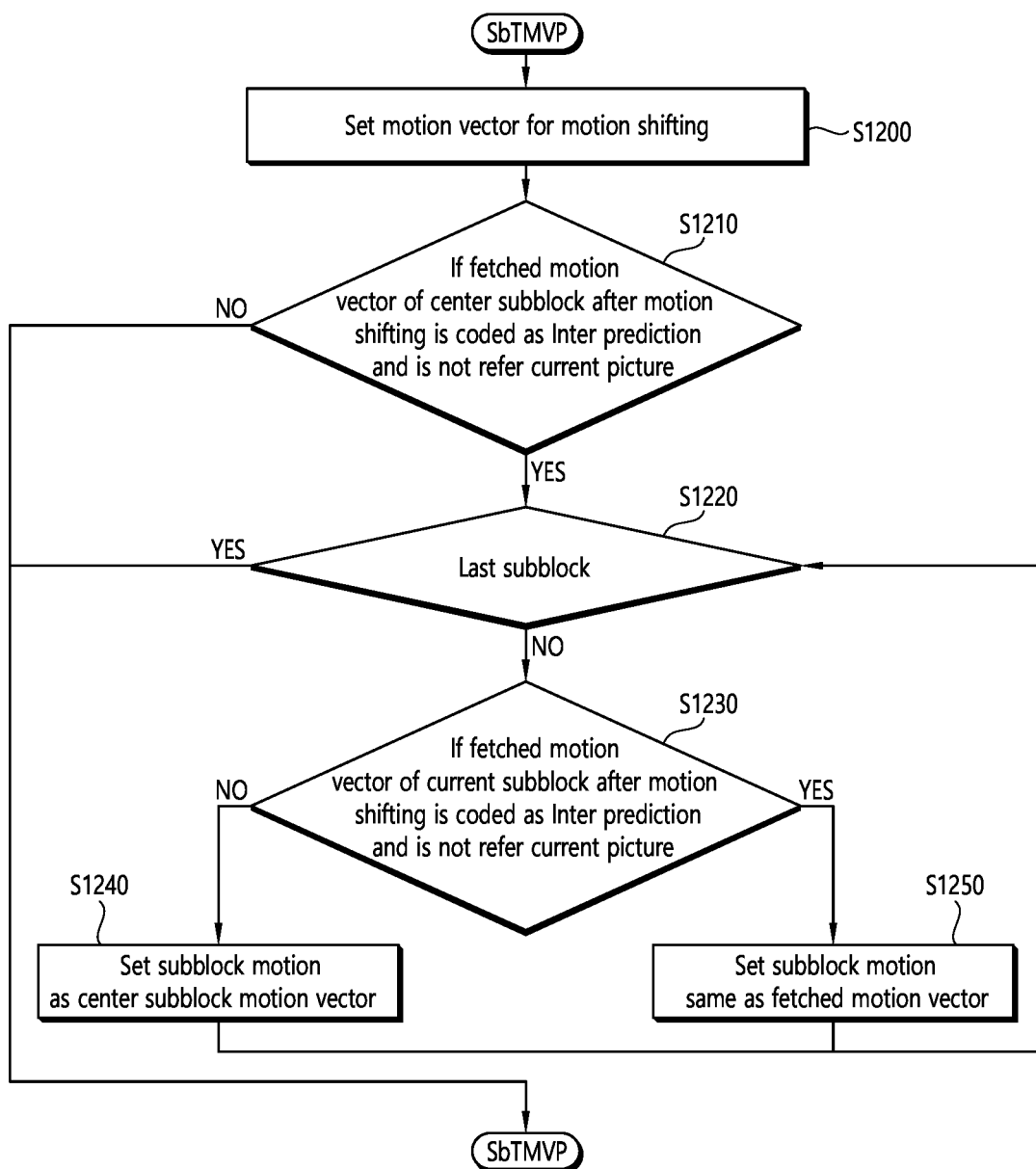
FIG. 12 illustrates another exemplary embodiment of the method for deriving the sbTMVP candidate considering the CPR.

FIG. 12 illustrates another exemplary embodiment of the method for deriving the sbTMVP candidate considering the CPR.

Referring to FIG. 12, the encoding apparatus/the decoding apparatus may set the motion information (i.e., motion vector) for the motion shift (S1200).

Here, the motion information for the motion shift may include the motion vector derived from the spatial neighboring block. The spatial neighboring block may include at least one of the bottom-left corner neighboring block (A0), left neighboring block (A1), top-right corner neighboring block (B0), top neighboring block (B1), and top-left corner neighboring block (B2) of the current block. Alternatively, the spatial neighboring block may include only the left neighboring block (A1) of the current block.

According to the exemplary embodiment, the encoding apparatus/the decoding apparatus may derive the motion vector from one (e.g., left neighboring block (A1)) of the spatial neighboring blocks to derive the reference block for the current block, and derive the reference block for the current block by performing the motion shift based on the motion vector of the spatial neighboring block (e.g., left neighboring block (A1)).

Here, as described above, the reference block may be the col block derived based on the motion shift in the collocated reference picture (i.e., col picture) used to derive the sbTMVP candidate. For example, the reference block may be the col block motion-shifted by the motion vector of the spatial neighboring block (e.g., left neighboring block (A1)) based on the position of the center sample of the current block. For convenience of explanation, the motion-shifted reference block may be referred to as the center reference block, the center reference subblock, the center subblock, or the like.

The encoding apparatus/the decoding apparatus may determine whether the motion information of the reference block (i.e., center subblock) derived based on the motion shift is available (S1210). At this time, according to the exemplary embodiment illustrated in FIG. 12, the encoding apparatus/the decoding apparatus may determine whether the reference block (i.e., center subblock) is the block coded in the inter prediction mode and is not the CPR block referring to the current picture.

Here, the CPR block refers to the block coded in the mode (CPR mode or IBC mode) in which the prediction is performed with reference to the current picture. For example, the encoding apparatus/the decoding apparatus may determine whether the reference block is the CPR block based on whether the first reference picture to which the reference block refers is the same as the second reference block in which the reference block is positioned. In other words, if the first reference picture and the second reference picture are the same, the reference block may be the CPR block.

If the reference block (i.e., center subblock) is not the block coded in the inter prediction mode or the reference block (i.e., center subblock) is the CPR block, the encoding apparatus/the decoding apparatus may not perform the process of deriving the sbTMVP candidate. In this case, the encoding apparatus/the decoding apparatus may exclude the sbTMVP candidate from the motion information candidate list by determining that the sbTMVP candidate is not available. Here, as described above, the motion information candidate list may be the subblock-based merge candidate list including the affine merge candidates and the sbTMVP candidate derived based on the affine mode or the sbTMVP mode.

If the reference block (i.e., center subblock) is the block coded in the inter prediction mode and is not the CPR block, the encoding apparatus/the decoding apparatus may perform the process of deriving the subblock based the motion information for the current block (i.e., process of deriving the sbTMVP candidate). In other words, the encoding apparatus/the decoding apparatus may perform a next process for each of the reference subblocks of the current block in units of subblock. Here, the reference subblocks may be subblocks (i.e., col subblocks) on the reference picture (i.e., col picture) corresponding to each of the subblocks in the current block. For example, the current block may include the first to $n^{th}$ subblocks, and correspondingly, the reference subblocks may also include the first to $n^{th}$ subblocks. In other words, the encoding apparatus/the decoding apparatus may perform a next process for each of the first to $n^{th}$ reference subblocks.

The encoding apparatus/the decoding apparatus may determine whether the current reference subblock is any one of the first to the $n^{th}$ reference subblocks (S1220). In other words, the encoding apparatus/the decoding apparatus may determine whether the current reference subblock is the last subblock, and if it is the last subblock, the encoding apparatus/the decoding apparatus may terminate the process of deriving the sbTMVP candidate, and otherwise, continue to perform the process of deriving the sbTMVP candidate.

If the current reference subblock is any one of the first to $n^{th}$ reference subblocks, the encoding apparatus/the decoding apparatus may determine whether the current reference subblock is the block coded in the inter prediction mode and is not the CPR block (S1230).

If the current reference subblock is not the block coded in the inter prediction mode or the current reference subblock is the CPR block, the encoding apparatus/the decoding apparatus may set the motion information of the center reference subblock as the subblock based the motion information for the current block (S1240). In other words, the motion information for the subblock in the current block corresponding to the current reference subblock may be set as the motion information of the center reference subblock.

If the current reference subblock is the block coded in the inter prediction mode and is not the CPR block, the encoding apparatus/the decoding apparatus may set the motion information of the current reference subblock as the subblock based the motion information for the current block by deriving the motion information of the current reference subblock (S1250).

Figure 13:
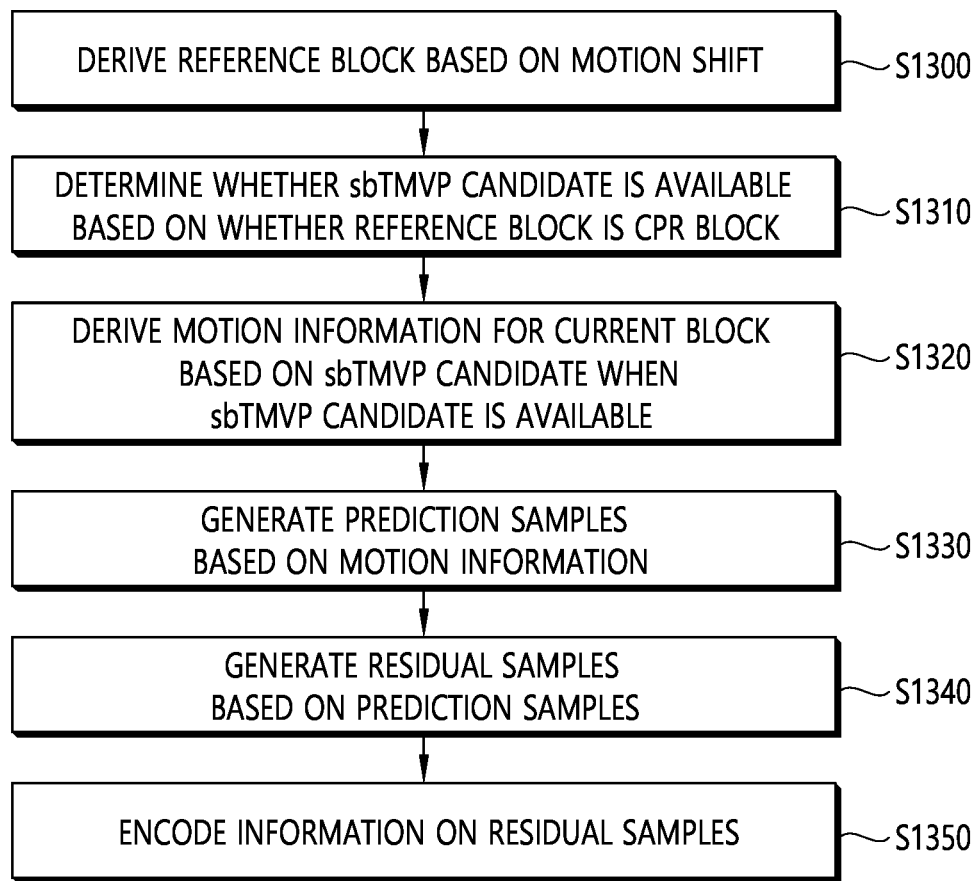
FIG. 13 is a flowchart schematically illustrating an encoding method which may be performed by the encoding apparatus according to the exemplary embodiment of the present document.

FIG. 13 is a flowchart schematically illustrating the encoding method which may be performed by the encoding apparatus according to the exemplary embodiment of the present document.

A method illustrated in FIG. 13 may be performed by the encoding apparatus 200 illustrated in FIG. 2. Specifically, steps S1300 to S1330 illustrated in FIG. 13 may be performed by the predictor 220 and the inter predictor 221 illustrated in FIG. 2, a step S1340 illustrated in FIG. 13 may be performed by the residual processor 230 illustrated in FIG. 2, and a step S1350 illustrated in FIG. 13 may be performed by the entropy encoder 240 illustrated in FIG. 2. Further, the method illustrated in FIG. 13 may include the exemplary embodiments described above in the present document. Therefore, in FIG. 13, detailed descriptions of contents overlapping the aforementioned exemplary embodiments will be omitted or simplified.

Referring to FIG. 13, the encoding apparatus may derive the reference block based on the motion shift (S1300).

Here, the motion shift may be performed to specify the reference block on the reference picture based on the motion vector of the spatial neighboring block.

According to the exemplary embodiment, the encoding apparatus may first derive the motion vector from the spatial neighboring block of the current block.

For example, the spatial neighboring block may include at least one of the bottom-left corner neighboring block (A0), left neighboring block (A1), top-right corner neighboring block (B0), top neighboring block (B1), and top-left corner neighboring block (B2) of the current block. In this case, the encoding apparatus may detect the motion vector (temporal vector) of the first available spatial neighboring block while searching for the spatial neighboring blocks according to the predetermined searching order, and set, as the reference block (i.e., col block), the block at the position indicated by the motion vector (temporal vector) of the spatial neighboring block in the reference picture.

At this time, whether the spatial neighboring block is available may be determined by the reference picture information, prediction mode information, position information, and the like of the spatial neighboring block. For example, if the reference picture of the spatial neighboring block and the reference picture of the current block are the same, it may be determined that the corresponding spatial neighboring block is available. Alternatively, if the spatial neighboring block is coded in the intra prediction mode or the spatial neighboring block is positioned outside the current picture/tile, it may be determined that the corresponding spatial neighboring block is not available.

Further, the searching order of the spatial neighboring block may be variously defined, and for example, may be the order of A1, B1, B0, A0, and B2. Alternatively, whether the A1 is available may be determined by searching for only the A1.

Alternatively, as another example, the spatial neighboring block may also include only the specific neighboring block, and for example, include only the left neighboring block (A1) of the current block. In this case, the encoding apparatus may determine whether the spatial neighboring block (e.g., A1) is available. For example, if the reference picture of the spatial neighboring block (e.g., A1) uses the reference picture (i.e., col picture) of the current block, it may be determined that the spatial neighboring block (e.g., A1) is available, and the motion vector of the spatial neighboring block (e.g., A1) may be derived. At this time, the motion vector of the spatial neighboring block (e.g., A1) may be referred to as a temporal MV (tempMV), and the motion vector may be used for the motion shift. Alternatively, if it is determined that the spatial neighboring block (e.g., A1) is not available, the temporal MV (i.e., motion vector of the spatial neighboring block) may be set as the zero vector. In other words, in this case, the motion shift may be set as (0, 0).

Next, the encoding apparatus may perform the motion shift based on the thus derived motion vector of the spatial neighboring block. For example, the encoding apparatus may perform the motion shift to the position indicated by the motion vector of the spatial neighboring block based on the position of the center sample of the current block. Here, the position of the center sample may indicate the position of the bottom-right end sample among 4 samples positioned at the center of the current block.

Further, the encoding apparatus may derive the reference block based on the motion-shifted position. In other words, the encoding apparatus may derive the reference block in the reference picture at the position motion-shifted by the motion vector of the spatial neighboring block based on the position of the center sample of the current block.

Here, as described above, the reference picture may be the col (collocated) picture used to derive the sbTMVP candidate, and the reference block may be the col block at the position motion-shifted based on the position of the center sample of the current block. At this time, the reference block may be referred to as the center reference block, the center subblock, or the like.

The encoding apparatus may determine whether the subblock temporal motion vector predictor (sbTMVP) candidate is available based on whether the reference block is the current picture referencing (CPR) block (S1310). The encoding apparatus may determine that the sbTMVP candidate is not available for the reference block, which is the CPR block.

Here, the CPR block refers to the block coded in the mode (CPR mode or IBC mode) in which the prediction is performed with reference to the current picture. For example, the encoding apparatus may determine whether the reference block is the CPR block based on whether the first reference picture to which the reference block refers is the same as the second reference picture in which the reference block is positioned. In other words, if the first reference picture and the second reference picture are the same, the reference block may be the CPR block.

According to the exemplary embodiment, in determining whether the sbTMVP candidate is available, if the inter prediction mode is not applied to the reference block or the first reference picture to which the reference block refers and the second reference picture in which the reference block is positioned are the same (i.e., if the reference block is the CPR block), the encoding apparatus may determine that the sbTMVP candidate is not available.

Alternatively, according to the exemplary embodiment, in determining whether the sbTMVP candidate is available, if the inter prediction mode is applied to the reference block and the first reference picture to which the reference block refers and the second reference picture in which the reference block is positioned are not the same (i.e., if the reference block is not the CPR block), the encoding apparatus may determine that the sbTMVP is available.

If the sbTMVP candidate is available, the encoding apparatus may derive the motion information for the current block based on the sbTMVP candidate (S1320). In other words, the encoding apparatus may derive the subblock based the motion information for the current block based on the sbTMVP candidate.

According to the exemplary embodiment, the encoding apparatus may derive the reference subblocks for each of the subblocks in the current block based on the motion shift in the reference picture including the reference block. Further, the encoding apparatus may derive as the subblock based the motion information for the current block by deriving the motion information of each of the reference subblocks.

For example, the current block may include the first to $n^{th}$ subblocks, and correspondingly, the reference subblocks may also include the first to $n^{th}$ subblocks. In this case, the encoding apparatus may apply the motion shift based on the position of the center sample of each of the first and $n^{th}$ subblocks included in the current block, and derive the first to $n^{th}$ reference subblocks at the motion-shifted position. The encoding apparatus may derive the motion information from each of the first and $n^{th}$ reference subblocks derived based on the motion shift.

At this time, the encoding apparatus may determine whether the motion information of the reference subblocks (e.g., first to $n^{th}$ reference subblocks) is available. For example, if the motion information of the specific reference subblock among the reference subblocks (e.g., first to $n^{th}$ reference subblocks) is not available, the encoding apparatus may set the motion information of the specific reference subblock as the base motion information. Here, the base motion information may mean the default motion information, and the motion information of the reference block derived in the aforementioned step S1300 may be used as the base motion information.

Further, the encoding apparatus may construct the motion information candidate list based on the subblock based the motion information for the current block. Here, as described above, the motion information candidate list may be the subblock-based merge candidate list including the affine merge candidates and the sbTMVP candidate derived based on the affine mode or the sbTMVP mode. For example, if it is determined that the sbTMVP candidate is available, the subblock based the motion information for the current block may be derived as described above, and in this case, the sbTMVP candidate may be included in the motion information candidate list. Alternatively, if it is determined that the sbTMVP candidate is not available, the sbTMVP candidate may be excluded from the motion information candidate list.

The encoding apparatus may generate the predicted samples based on the motion information for the current block (S1330).

The encoding apparatus may select the optimal motion information based on a rate-distortion (RD) cost, and generate the predicted samples based on the optimal motion information. For example, if the subblock based the motion information (i.e., sbTMVP) derived for the current block is selected as the optimal motion information, the encoding apparatus may generate the predicted samples of the current block based on the thus derived motion information for the subblocks of the current block.

The encoding apparatus may derive the residual samples based on the predicted samples (S1340), and encode the image information including the information on the residual samples (S1350).

In other words, the encoding apparatus may derive the residual samples based on the original samples for the current block and the predicted samples of the current block. Further, the encoding apparatus may generate the information on the residual samples. Here, the information on the residual samples may include the information such as the value information, position information, transform technique, transform kernel, quantization parameter, and the like of the quantized transform coefficients derived by performing the transform and quantization for the residual samples.

The encoding apparatus may encode the image information including the information on the residual samples to output the encoded image information in the form of the bitstream, and transmit the bitstream to the decoding apparatus through a network or storage media. Further, the encoding apparatus may include the motion information (e.g., information on the sbTMVP candidate) selected based on the rate-distortion (RD) cost in the image information, and encode the image information to output the encoded image information in the form of the bitstream.

Figure 14:
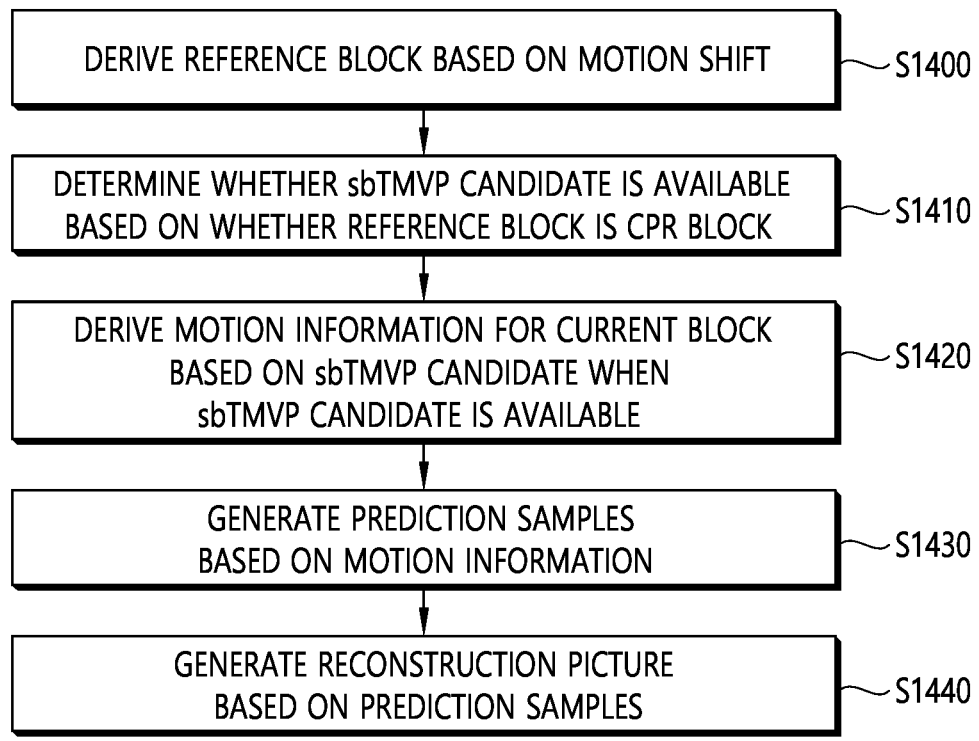
FIG. 14 is a flowchart schematically illustrating a decoding method which may be performed by the decoding apparatus according to the exemplary embodiment of the present document.

FIG. 14 is a flowchart schematically illustrating the decoding method which may be performed by the decoding apparatus according to the exemplary embodiment of the present document.

A method illustrated in FIG. 14 may be performed by the decoding apparatus 300 illustrated in FIG. 3. Specifically, steps S1400 to S1430 illustrated in FIG. 14 may be performed by the predictor 330 and the inter predictor 332 illustrated in FIG. 3, and a step S1440 illustrated in FIG. 14 may be performed by the adder 340 illustrated in FIG. 3. Further, the method illustrated in FIG. 14 may include the exemplary embodiments described above in the present document. Therefore, in FIG. 14, detailed descriptions of contents overlapping the aforementioned exemplary embodiments will be omitted and simplified.

Referring to FIG. 14, the decoding apparatus may derive the reference block based on the motion shift (S1400).

Here, the motion shift may be performed to specify the reference block on the reference picture based on the motion vector of the spatial neighboring block.

According to the exemplary embodiment, the decoding apparatus may first derive the motion vector from the spatial neighboring block of the current block.

For example, the spatial neighboring block may include at least one of the bottom-left corner neighboring block (A0), left neighboring block (A1), top-right corner neighboring block (B0), top neighboring block (B1), and top-left corner neighboring block (B2) of the current block. In this case, the decoding apparatus may detect the motion vector (temporal vector) of the first available spatial neighboring block while searching for the spatial neighboring blocks according to the predetermined searching order, and set, as the reference block (i.e., col block), the block at the position indicated by the motion vector (temporal vector) of the spatial neighboring block in the reference picture.

At this time, whether the spatial neighboring block is available may be determined by the reference picture information, prediction mode information, position information, and the like of the spatial neighboring block. For example, if the reference picture of the spatial neighboring block and the reference picture of the current block are the same, it may be determined that the corresponding spatial neighboring block is available. Alternatively, if the spatial neighboring block is coded in the intra prediction mode or the spatial neighboring block is positioned outside the current picture/tile, it may be determined that the corresponding spatial neighboring block is not available.

Further, the searching order of the spatial neighboring block may be variously defined, and for example, may be the order of A1, B1, B0, A0, and B2. Alternatively, whether the A1 is available may be determined by searching for only the A1.

Alternatively, as another example, the spatial neighboring block may also include only the specific neighboring block, and for example, include only the left neighboring block (A1) of the current block. In this case, the decoding apparatus may determine whether the spatial neighboring block (e.g., A1) is available. For example, if the reference picture of the spatial neighboring block (e.g., A1) uses the reference picture (i.e., col picture) of the current block, it may be determined that the spatial neighboring block (e.g., A1) is available, and the motion vector of the spatial neighboring block (e.g., A1) may be derived. At this time, the motion vector of the spatial neighboring block (e.g., A1) may be referred to as the temporal MV (tempMV), and the motion vector may be used for the motion shift. Alternatively, if it is determined that the spatial neighboring block (e.g., A1) is not available, the temporal MV (i.e., motion vector of the spatial neighboring block) may be set as the zero vector. In other words, in this case, the motion shift may be set as (0, 0).

Next, the decoding apparatus may perform the motion shift based on the thus derived motion vector of the spatial neighboring block. For example, the decoding apparatus may perform the motion shift to the position indicated by the motion vector of the spatial neighboring block based on the position of the center sample of the current block. Here, the position of the center sample may indicate the position of the bottom-right end sample among 4 samples positioned at the center of the current block.

Further, the decoding apparatus may derive the reference block based on the motion-shifted position. In other words, the decoding apparatus may derive the reference block in the reference picture at the position motion-shifted by the motion vector of the spatial neighboring block based on the position of the center sample of the current block.

Here, as described above, the reference picture may be the col (collocated) picture used to derive the sbTMVP candidate, and the reference block may be the col block at the position motion-shifted based on the position of the center sample of the current block. At this time, the reference block may be referred to as the center reference block, the center subblock, or the like.

The decoding apparatus may determine whether the subblock temporal motion vector predictor (sbTMVP) candidate is available based on whether the reference block is the current picture referencing (CPR) block (S1410). The decoding apparatus may determine that the sbTMVP candidate is not available for the reference block, which is the CPR block.

Here, the CPR block refers to the block coded in the mode (CPR mode or IBC mode) in which the prediction is performed with reference to the current picture. For example, the decoding apparatus may determine whether the reference block is the CPR block based on whether the first reference picture to which the reference block refers is the same as the second reference picture in which the reference block is positioned. In other words, if the first reference picture and the second reference picture are the same, the reference block may be the CPR block.

According to the exemplary embodiment, in determining whether the sbTMVP candidate is available, if the inter prediction mode is not applied to the reference block or the first reference picture to which the reference block refers and the second reference picture in which the reference block is positioned are the same (i.e., if the reference block is the CPR block), the decoding apparatus may determine that the sbTMVP candidate is not available.

Alternatively, according to the exemplary embodiment, in determining whether the sbTMVP candidate is available, if the inter prediction mode is applied to the reference block and the first reference picture to which the reference block refers and the second reference picture in which the reference block is positioned are not the same (i.e., if the reference block is not the CPR block), the decoding apparatus may determine whether the sbTMVP candidate is available.

The decoding apparatus may derive the motion information for the current block based on the sbTMVP candidate if the sbTMVP candidate is available (S1420). In other words, the decoding apparatus may derive the subblock based the motion information for the current block based on the sbTMVP candidate.

According to the exemplary embodiment, the decoding apparatus may derive the reference subblocks for each of the subblocks in the current block based on the motion shift in the reference picture including the reference block. Further, the decoding apparatus may derive as the subblock based the motion information for the current block by deriving the motion information of each of the reference subblocks.

For example, the current block may include the first to $n^{th}$ subblocks, and correspondingly, the reference subblocks may also include the first to $n^{th}$ subblocks. In this case, the decoding apparatus may apply the motion shift based on the position of the center sample of each of the first and $n^{th}$ subblocks included in the current block, and derive the first to $n^{th}$ reference subblocks at the motion-shifted position. The decoding apparatus may derive the motion information from each of the first and $n^{th}$ reference subblocks derived based on the motion shift.

At this time, the decoding apparatus may determine whether the motion information of the reference subblocks (e.g., first to $n^{th}$ reference subblocks) is available. For example, if the motion information of the specific reference subblock among the reference subblocks (e.g., first to $n^{th}$ reference subblocks) is not available, the decoding apparatus may set the motion information of the specific reference subblock as the base motion information. Here, the base motion information may mean the default motion information, and the motion information of the reference block derived in the aforementioned step S1400 may be used as the base motion information.

Further, the decoding apparatus may construct the motion information candidate list based on the subblock based the motion information for the current block. Here, as described above, the motion information candidate list may be the subblock-based merge candidate list including the affine merge candidates and the sbTMVP candidate derived based on the affine mode or the sbTMVP mode. For example, if it is determined that the sbTMVP candidate is available, the subblock based the motion information for the current block may be derived as described above, and in this case, the sbTMVP candidate may be included in the motion information candidate list. Alternatively, if it is determined that the sbTMVP candidate is not available, the sbTMVP candidate may be excluded from the motion information candidate list.

The decoding apparatus may generate the predicted samples based on the motion information for the current block (S1430).

According to the exemplary embodiment, the decoding apparatus may construct the motion information candidate list (e.g., subblock-based merge candidate list) including the thus derived subblock based motion information (i.e., sbTMVP candidate) for the current block, and obtain the candidate index information (e.g., subblock-based merge candidate index) signaled by the encoding apparatus. The decoding apparatus may select the candidate indicated by the candidate index information (e.g., subblock-based merge candidate index) in the motion information candidate list (e.g., subblock-based merge candidate list) to derive the candidate as the motion information for the subblock of the current block. At this time, if the thus derived motion information (i.e., sbTMVP candidate) for the subblocks of the current block is selected from the motion information candidate list (e.g., subblock-based merge candidate list) by the candidate index information, the decoding apparatus may generate the predicted samples of the current block based on the thus derived motion information for the subblocks of the current block.

The decoding apparatus may generate the reconstructed picture based on the predicted samples (S1440).

According to the exemplary embodiment, the decoding apparatus may also use the predicted samples as the reconstructed samples directly according to the prediction mode, or also generate the reconstructed samples by adding the residual samples to the predicted samples.

The decoding apparatus may receive the information on the residual sample for the current block if the residual sample for the current block exists. The information on the residual sample may include the transform coefficient about the residual samples. The decoding apparatus may derive the residual samples (or residual sample array) for the current block based on the residual information. The decoding apparatus may generate the reconstructed samples based on the predicted samples and the residual samples, and derive the reconstructed block or the reconstructed picture based on the reconstructed samples.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (e.g., information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 15:
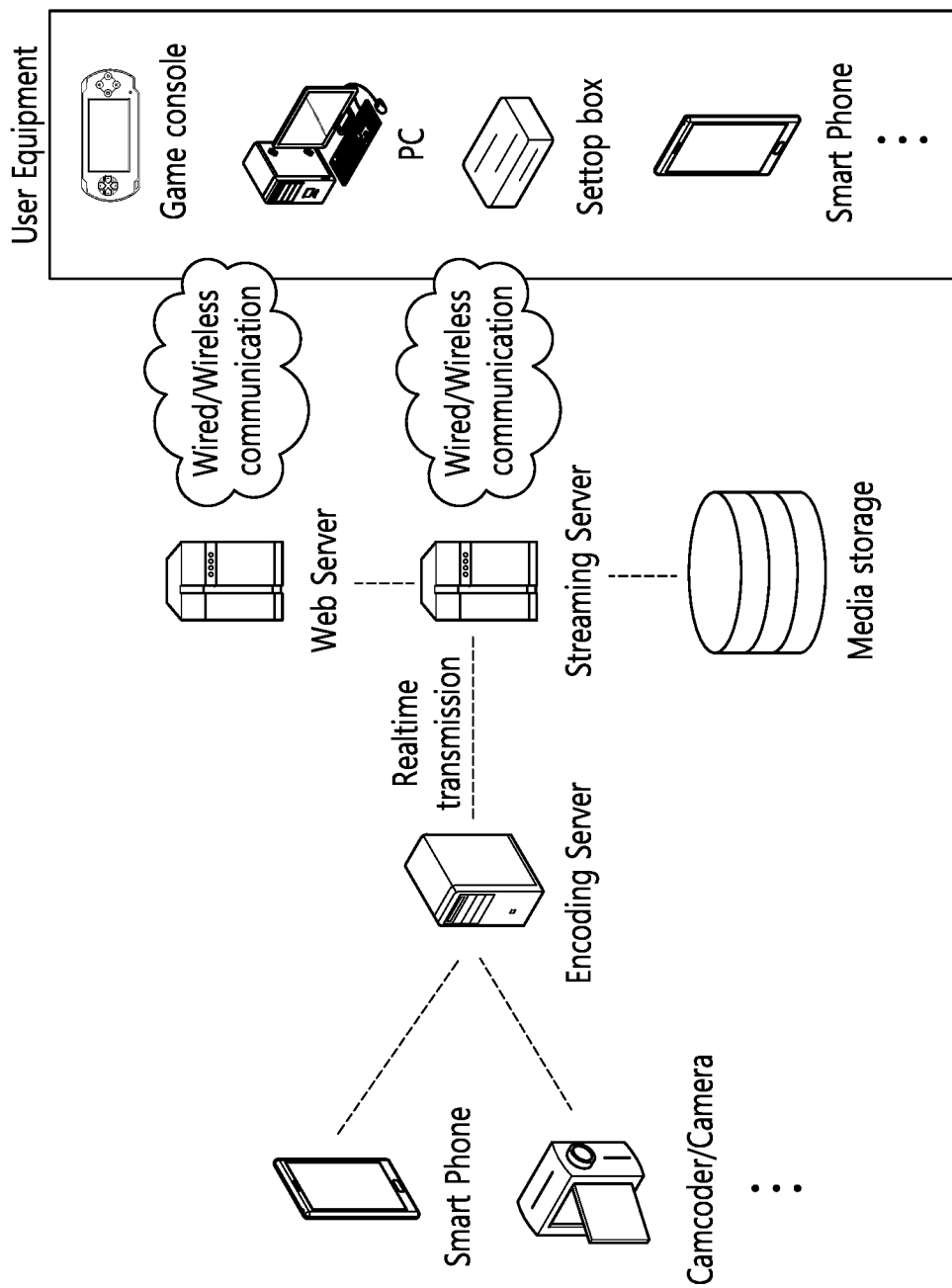
FIG. 15 illustrates an example of a content streaming system to which the exemplary embodiments disclosed in the present document are applicable.

FIG. 15 illustrates an example of a content streaming system to which embodiments disclosed in this document may be applied.

Referring to FIG. 15, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

What is claimed is:

1. An image decoding method performed by a decoding apparatus, the method comprising:
   deriving a reference block based on a motion shift;
   determining availability of a subblock-based temporal motion vector predictor (sbTMVP) candidate for a current block, based on a prediction mode of the reference block;
   deriving motion information for subblocks of the current block based on a case where the sbTMVP candidate is available;
   generating predicted samples based on the motion information for the subblocks of the current block; and
   generating a reconstructed picture based on the predicted samples, wherein the deriving the motion information for the subblocks of the current block comprises:
   deriving a reference subblock for each of the subblocks in the current block based on the motion shift, in a reference picture including the reference block; and
   deriving the motion information for the each of the subblocks in the current block based on whether the each of the reference subblocks is available,
   wherein whether the each of the reference subblocks is available is determined based on a prediction mode of the each of the reference subblocks, and
   wherein the each of the reference subblock is determined as unavailable based on the prediction mode of the each of the reference subblocks being a current picture referencing (CPR) mode.

2. The image decoding method of claim 1, wherein based on a case where the prediction mode of the reference block is not an inter prediction mode or a first reference picture to which the reference block refers and a second reference picture in which the reference block is positioned are the same, it is determined that the sbTMVP candidate is not available.

3. The image decoding method of claim 1, wherein based on a case where the prediction mode of the reference block is an inter prediction mode and a first reference picture to which the reference block refers and a second reference picture in which the reference block is positioned are not the same, it is determined that the sbTMVP candidate is available.

4. The image decoding method of claim 1, wherein
   based on a case where the prediction mode of a specific reference subblock among the reference subblocks is not an inter prediction mode, it is determined that the specific reference subblock is not available,
   wherein motion information for a subblock in the current block corresponding to the unavailable specific reference subblock is derived as base motion information.

5. The image decoding method of claim 1, further comprising: constructing a motion information candidate list for the current block,
   wherein based on a case where the sbTMVP candidate is available, the sbTMVP candidate is included in the motion information candidate list, and
   wherein based on a case where the sbTMVP candidate is not available, the sbTMVP candidate is excluded from the motion information candidate list.

6. The image decoding method of claim 1, wherein the deriving of the reference block comprises:
deriving a motion vector from a spatial neighboring block of the current block;
performing a motion shift to a position indicated by the motion vector of the spatial neighboring block based on a position of a center sample of the current block; and
deriving the reference block based on the motion-shifted position.

7. The image decoding method of claim 6, wherein the spatial neighboring block is a left neighboring block positioned at a left of the current block, and
wherein the motion vector of the spatial neighboring block is a motion vector derived from the left neighboring block based on whether the left neighboring block is available.

8. An image encoding method performed by an encoding apparatus, the method comprising:
deriving a reference block based on a motion shift;
determining availability of a subblock-based temporal motion vector predictor (sbTMVP) candidate for a current block, based on a prediction mode of the reference block;
deriving motion information for subblocks of the current block based on a case where the sbTMVP candidate is available;
generating predicted samples based on the motion information for the subblocks of the current block;
generating residual samples based on the predicted samples; and
encoding image information including information on the residual samples, wherein the deriving the motion information for the subblocks of the current block comprises:
deriving a reference subblock for each of the subblocks in the current block based on the motion shift, in a reference picture including the reference block; and
deriving the motion information for the each of the subblocks in the current block based on whether the each of the reference subblocks is available,
wherein whether the each of the reference subblocks is available is determined based on a prediction mode of the each of the reference subblocks, and
wherein the each of the reference subblock is determined as unavailable based on the prediction mode of the each of the reference subblocks being a current picture referencing (CPR) mode.

9. The image encoding method of claim 8, wherein based on a case where the prediction mode of the reference block is not an inter prediction mode or a first reference picture to which the reference block refers and a second reference picture in which the reference block is positioned are the same, it is determined that the sbTMVP candidate is not available.

10. The image encoding method of claim 8, wherein based on a case where the prediction mode of the reference block is an inter prediction mode and a first reference picture to which the reference block refers and a second reference picture in which the reference block is positioned are not the same, it is determined that the sbTMVP candidate is available.

11. The image encoding method of claim 8,
wherein based on a case where the prediction mode of a specific reference subblock among the reference subblocks is not an inter prediction mode, it is determined that the specific reference subblock is not available,
wherein motion information for a subblock in the current block corresponding to the unavailable specific reference subblock is derived as base motion information.

12. A non-transitory computer-readable storage medium storing encoded image information generated by an image encoding method, the image encoding method comprises:
deriving a reference block based on a motion shift;
determining availability of a subblock-based temporal motion vector predictor (sbTMVP) candidate for a current block, based on a prediction mode of the reference block;
deriving motion information for subblocks of the current block based on a case where the sbTMVP candidate is available;
generating predicted samples based on the motion information for the subblocks of the current block;
generating residual samples based on the predicted samples; and
encoding image information including information on the residual samples, wherein the deriving the motion information for the subblocks of the current block comprises:
deriving a reference subblock for each of the subblocks in the current block based on the motion shift, in a reference picture including the reference block; and
deriving the motion information for the each of the subblocks in the current block based on whether the each of the reference subblocks is available,
wherein whether the each of the reference subblocks is available is determined based on a prediction mode of the each of the reference subblocks, and
wherein the each of the reference subblock is determined as unavailable based on the prediction mode of the each of the reference subblocks being a current picture referencing (CPR) mode.

* * * * *